US012627787B2

(12) United States Patent
Porubanova et al.

(10) Patent No.: US 12,627,787 B2
(45) Date of Patent: May 12, 2026

(54) DISTANCE-BASED VERTICAL MISALIGNMENT CORRECTION

(71) Applicant: Microsoft Technology Licensing, LLC, Redmond, WA (US)

(72) Inventors: Michaela Porubanova, Seattle, WA (US); Bjorn Nicolaas Servatius Vlaskamp, Seattle, WA (US); Jacob Elliott Hadnett-Hunter, Ely (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 18/194,884

(22) Filed: Apr. 3, 2023

(65) Prior Publication Data

US 2024/0333906 A1    Oct. 3, 2024

(51) Int. Cl.
H04N 13/327 (2018.01)
G02B 27/01 (2006.01)
G09G 3/00 (2006.01)
H04N 13/344 (2018.01)

(52) U.S. Cl.
CPC ....... H04N 13/327 (2018.05); G02B 27/0172 (2013.01); G09G 3/003 (2013.01); H04N 13/344 (2018.05); *G02B 2027/0134* (2013.01); *G02B 2027/0178* (2013.01); *G02B 2027/0181* (2013.01); *G02B 2027/0198* (2013.01); *G02B 2207/117* (2013.01); *G09G 2320/0693* (2013.01)

(58) Field of Classification Search
None
See application file for complete search history.

(56) References Cited

U.S. PATENT DOCUMENTS

| | | |
|---|---|---|
| 2007/0285663 A1 | 12/2007 | Hewitt |
| 2008/0024391 A1 | 1/2008 | Oliver et al. |
| 2012/0218388 A1 | 8/2012 | Kawakami |
| 2013/0038510 A1 | 2/2013 | Brin et al. |
| 2013/0235169 A1 | 9/2013 | Kato et al. |

(Continued)

OTHER PUBLICATIONS

International Search Report and Written Opinion received for PCT Application No. PCT/US2023/036975, Apr. 5, 2024, 14 pages.

(Continued)

*Primary Examiner* — Samuel D Fereja
(74) *Attorney, Agent, or Firm* — Alleman Hall LLP

(57)    ABSTRACT

A method for correcting vertical misalignment in a binocular display system comprises receiving a signal from a misalignment detection system comprising information related to vertical misalignment between a left eye display and a right eye display of the binocular display system. Image content displayed via the binocular display system is analyzed to determine a distance to a foreground virtual object in the image content at which a user is gazing. The method further comprises analyzing depth image data to determine a distance to a background object in a real-world environment. A vertical misalignment correction strategy is determined based at least upon the distance to the foreground virtual object and the distance to the background object. Based upon the vertical misalignment correction strategy, the binocular display system is controlled to correct the vertical misalignment.

19 Claims, 13 Drawing Sheets

(56) References Cited

U.S. PATENT DOCUMENTS

| | | | |
|---|---|---|---|
| 2014/0375680 A1 * | 12/2014 | Ackerman | G02B 27/017 |
| | | | 345/633 |
| 2016/0117864 A1 | 4/2016 | Cajigas | |
| 2017/0148206 A1 | 5/2017 | Lalonde et al. | |
| 2019/0043236 A1 * | 2/2019 | Jones | G06V 10/56 |
| 2019/0238818 A1 * | 8/2019 | Held | H04N 13/139 |
| 2021/0181840 A1 | 6/2021 | Vlaskamp | |
| 2021/0397253 A1 | 12/2021 | Kocdemir | |
| 2023/0239456 A1 * | 7/2023 | Xiao | G06F 1/1686 |
| | | | 348/53 |
| 2023/0273444 A1 | 8/2023 | Demaster-Smith | |
| 2023/0368403 A1 | 11/2023 | Porubanova | |
| 2024/0212535 A1 | 6/2024 | Porubanova | |

OTHER PUBLICATIONS

Jin, et al., "Creating a comfortable stereoscopic viewing experience:
Effects of viewing distance and field of view on fusional range",
Stereoscopic Displays and Virtual Reality Systems XII, vol. 5664,
Mar. 22, 2005, pp. 10-21.
International Search Report and Written Opinion received for PCT
Application No. PCT/US2024/021241, Jun. 4, 2024, 14 pages.
Non-Final Office Action mailed on Oct. 10, 2024, in U.S. Appl. No.
18/086,868, 12 pages.
Notice of Allowance mailed on Feb. 12, 2025, in U.S. Appl. No.
18/086,868, 08 pages.

* cited by examiner

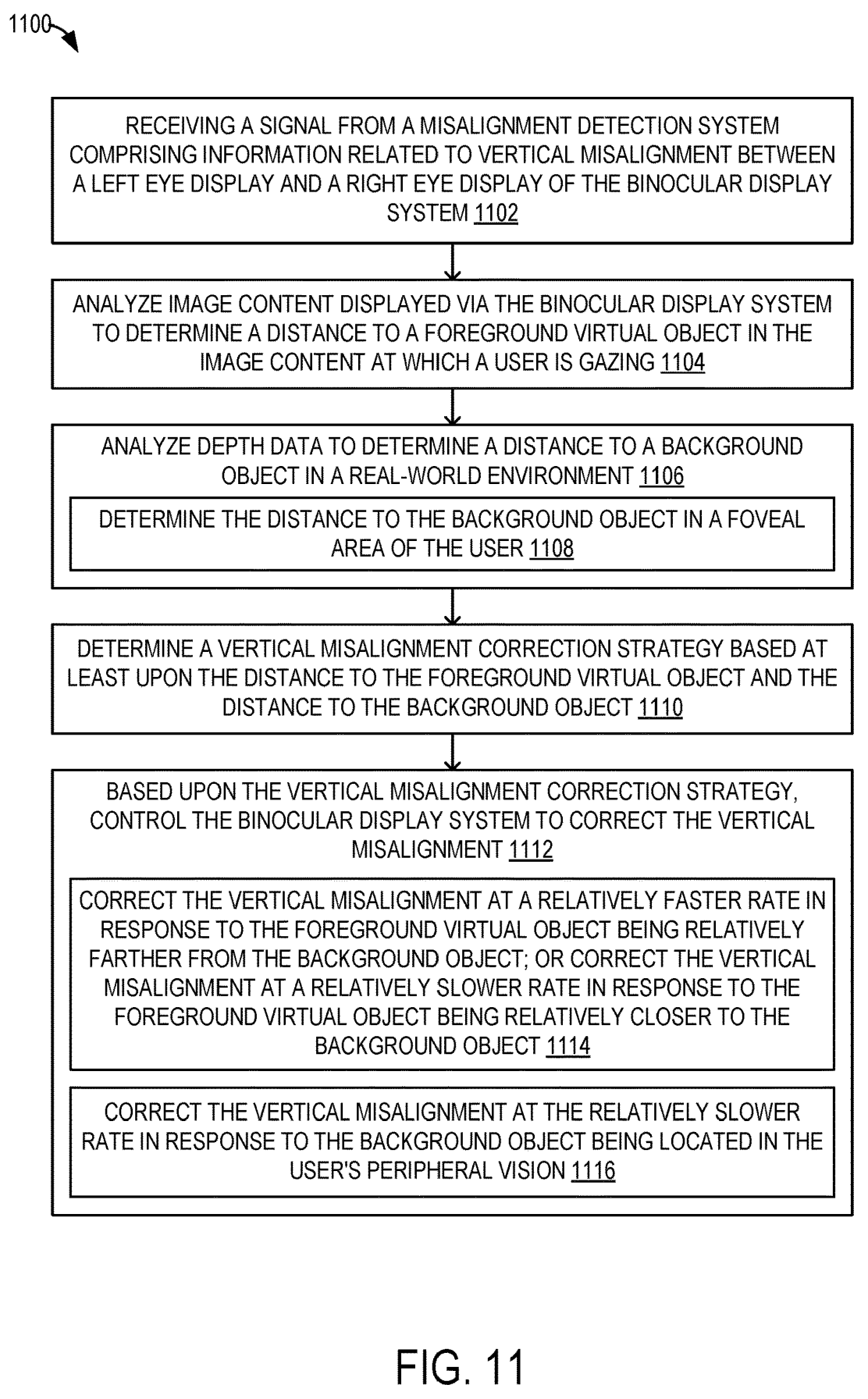

1100

```
┌─────────────────────────────────────────────────────────────────────┐
│  RECEIVING A SIGNAL FROM A MISALIGNMENT DETECTION SYSTEM             │
│  COMPRISING INFORMATION RELATED TO VERTICAL MISALIGNMENT BETWEEN     │
│  A LEFT EYE DISPLAY AND A RIGHT EYE DISPLAY OF THE BINOCULAR DISPLAY  │
│  SYSTEM 1102                                                         │
└─────────────────────────────────────────────────────────────────────┘
                                 ↓
┌─────────────────────────────────────────────────────────────────────┐
│  ANALYZE IMAGE CONTENT DISPLAYED VIA THE BINOCULAR DISPLAY SYSTEM    │
│  TO DETERMINE A DISTANCE TO A FOREGROUND VIRTUAL OBJECT IN THE        │
│  IMAGE CONTENT AT WHICH A USER IS GAZING 1104                        │
└─────────────────────────────────────────────────────────────────────┘
                                 ↓
┌─────────────────────────────────────────────────────────────────────┐
│  ANALYZE DEPTH DATA TO DETERMINE A DISTANCE TO A BACKGROUND          │
│  OBJECT IN A REAL-WORLD ENVIRONMENT 1106                             │
│  ┌───────────────────────────────────────────────────────────────┐  │
│  │ DETERMINE THE DISTANCE TO THE BACKGROUND OBJECT IN A FOVEAL    │  │
│  │ AREA OF THE USER 1108                                          │  │
│  └───────────────────────────────────────────────────────────────┘  │
└─────────────────────────────────────────────────────────────────────┘
                                 ↓
┌─────────────────────────────────────────────────────────────────────┐
│  DETERMINE A VERTICAL MISALIGNMENT CORRECTION STRATEGY BASED AT      │
│  LEAST UPON THE DISTANCE TO THE FOREGROUND VIRTUAL OBJECT AND THE     │
│  DISTANCE TO THE BACKGROUND OBJECT 1110                              │
└─────────────────────────────────────────────────────────────────────┘
                                 ↓
┌─────────────────────────────────────────────────────────────────────┐
│  BASED UPON THE VERTICAL MISALIGNMENT CORRECTION STRATEGY,           │
│  CONTROL THE BINOCULAR DISPLAY SYSTEM TO CORRECT THE VERTICAL         │
│  MISALIGNMENT 1112                                                   │
│  ┌───────────────────────────────────────────────────────────────┐  │
│  │ CORRECT THE VERTICAL MISALIGNMENT AT A RELATIVELY FASTER RATE  │  │
│  │ IN RESPONSE TO THE FOREGROUND VIRTUAL OBJECT BEING RELATIVELY  │  │
│  │ FARTHER FROM THE BACKGROUND OBJECT; OR CORRECT THE VERTICAL    │  │
│  │ MISALIGNMENT AT A RELATIVELY SLOWER RATE IN RESPONSE TO THE    │  │
│  │ FOREGROUND VIRTUAL OBJECT BEING RELATIVELY CLOSER TO THE       │  │
│  │ BACKGROUND OBJECT 1114                                         │  │
│  └───────────────────────────────────────────────────────────────┘  │
│  ┌───────────────────────────────────────────────────────────────┐  │
│  │ CORRECT THE VERTICAL MISALIGNMENT AT THE RELATIVELY SLOWER     │  │
│  │ RATE IN RESPONSE TO THE BACKGROUND OBJECT BEING LOCATED IN THE │  │
│  │ USER'S PERIPHERAL VISION 1116                                  │  │
│  └───────────────────────────────────────────────────────────────┘  │
└─────────────────────────────────────────────────────────────────────┘
```

FIG. 11

DISTANCE-BASED VERTICAL MISALIGNMENT CORRECTION

BACKGROUND

Mixed-reality (MR) systems, including virtual-reality (VR) and augmented-reality (AR) systems, can include separate left eye and right eye display components. The separate display components can display left eye and right eye images from different perspectives to provide a stereoscopic viewing experience for the user. Human vision systems fuse the different images, enabling the user to perceive the displayed content at a predetermined depth and/or location within a MR scene.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to correcting vertical misalignment in a binocular display system. One example provides a method comprising receiving a signal from a misalignment detection system. The signal comprises information related to vertical misalignment between a left eye display and a right eye display of the binocular display system. Image content displayed via the binocular display system is analyzed to determine a distance to a foreground virtual object in the image content at which a user is gazing. The method further comprises analyzing depth image data to determine a distance to a background object in a real-world environment, and determining a vertical misalignment correction strategy based at least upon the distance to the foreground virtual object and the distance to the background object. Based upon the vertical misalignment correction strategy, the binocular display system is controlled to correct the vertical misalignment.

BRIEF DESCRIPTION OF THE DRAWINGS

FIG. 11 is a block diagram of an example method for correcting vertical misalignment between left eye and right eye displays in a binocular display system.

DETAILED DESCRIPTION

As introduced above, mixed-reality (MR) systems, including virtual-reality (VR) and augmented-reality (AR) systems, can include separate left eye display and right eye display components to display different left and right eye images for stereoscopic image presentation.

Figure 1:
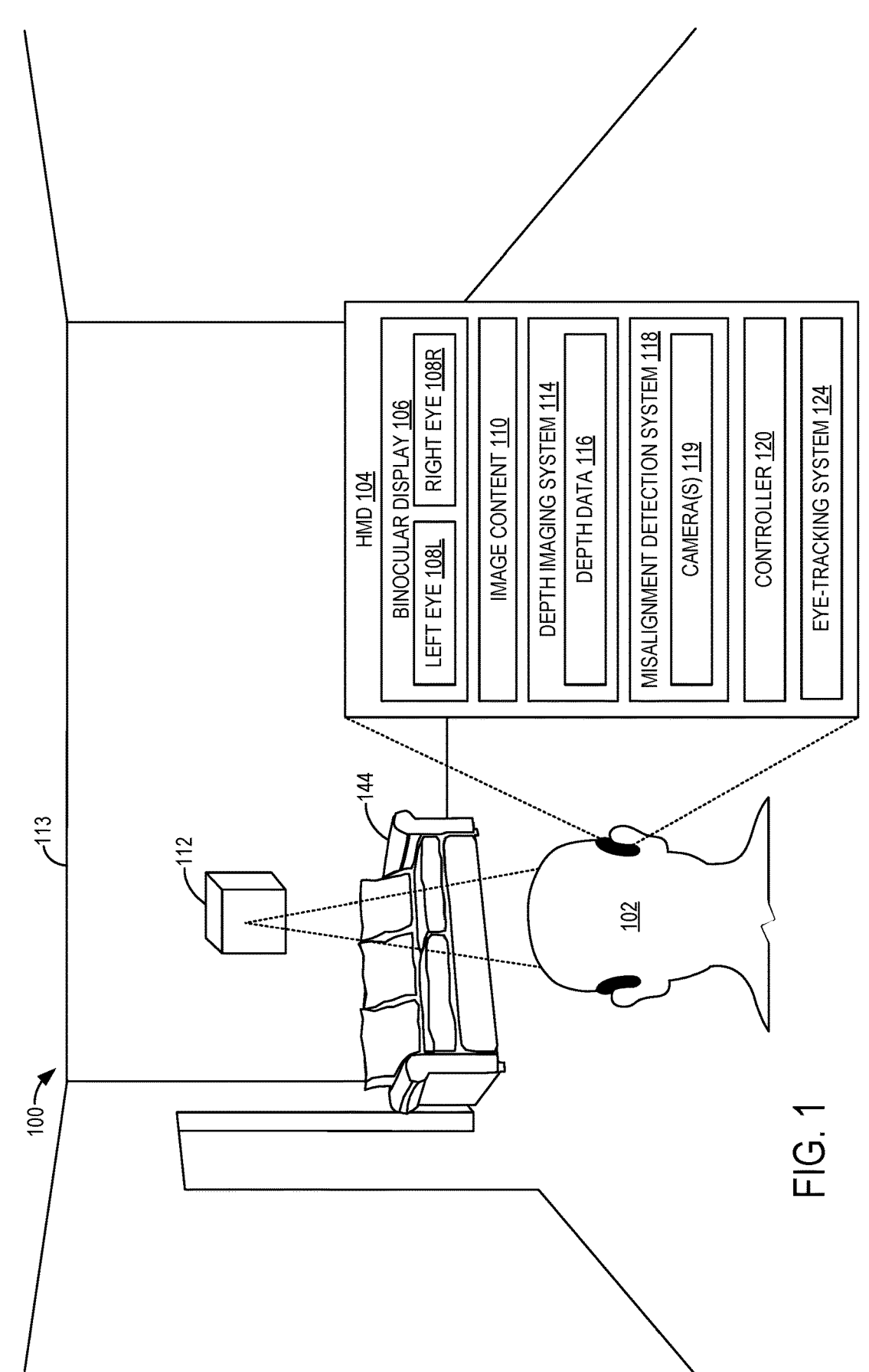
FIG. 1 shows an example of a real-world environment including a real-world background object and a head-mounted display (HMD) device that displays a foreground virtual object.

FIG. 1 shows an example real-world environment 100 in which a user 102 is wearing a head-mounted display (HMD) device 104. As described in more detail below, the HMD 104 comprises a binocular display system 106. The binocular display system 106 comprises a left eye display 108L and a right eye display 108R. The binocular display system 106 can display image content 110, such as a foreground virtual object 112, against a real world background 113.

Figure 2:
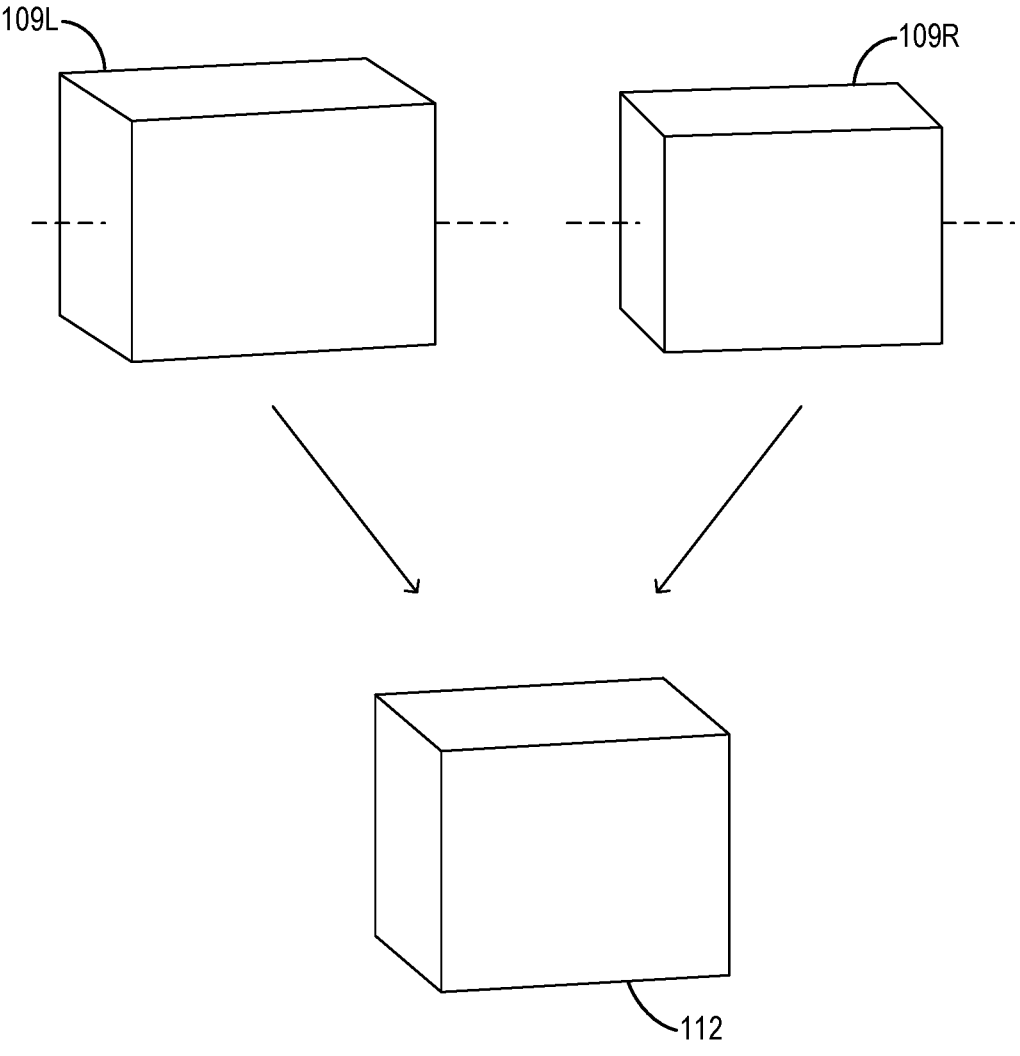
FIG. 2 schematically illustrates an example of a left eye image and a right eye image that can be displayed by the HMD of FIG. 1.

FIG. 2 shows an example of a left eye image 109L for display via the left eye display 108L of FIG. 1 and a right eye image 109R for display via the right eye display 108R. As illustrated, the left eye image 109L and the right eye image 109R are not vertically offset, with reference to the illustrated dashed line. Human vision systems can fuse the left eye image 109L and the right eye image 109R, enabling the user to perceive an apparent three-dimensional image of the foreground virtual object 112 at a predetermined depth and/or location within a MR scene.

Figure 3:
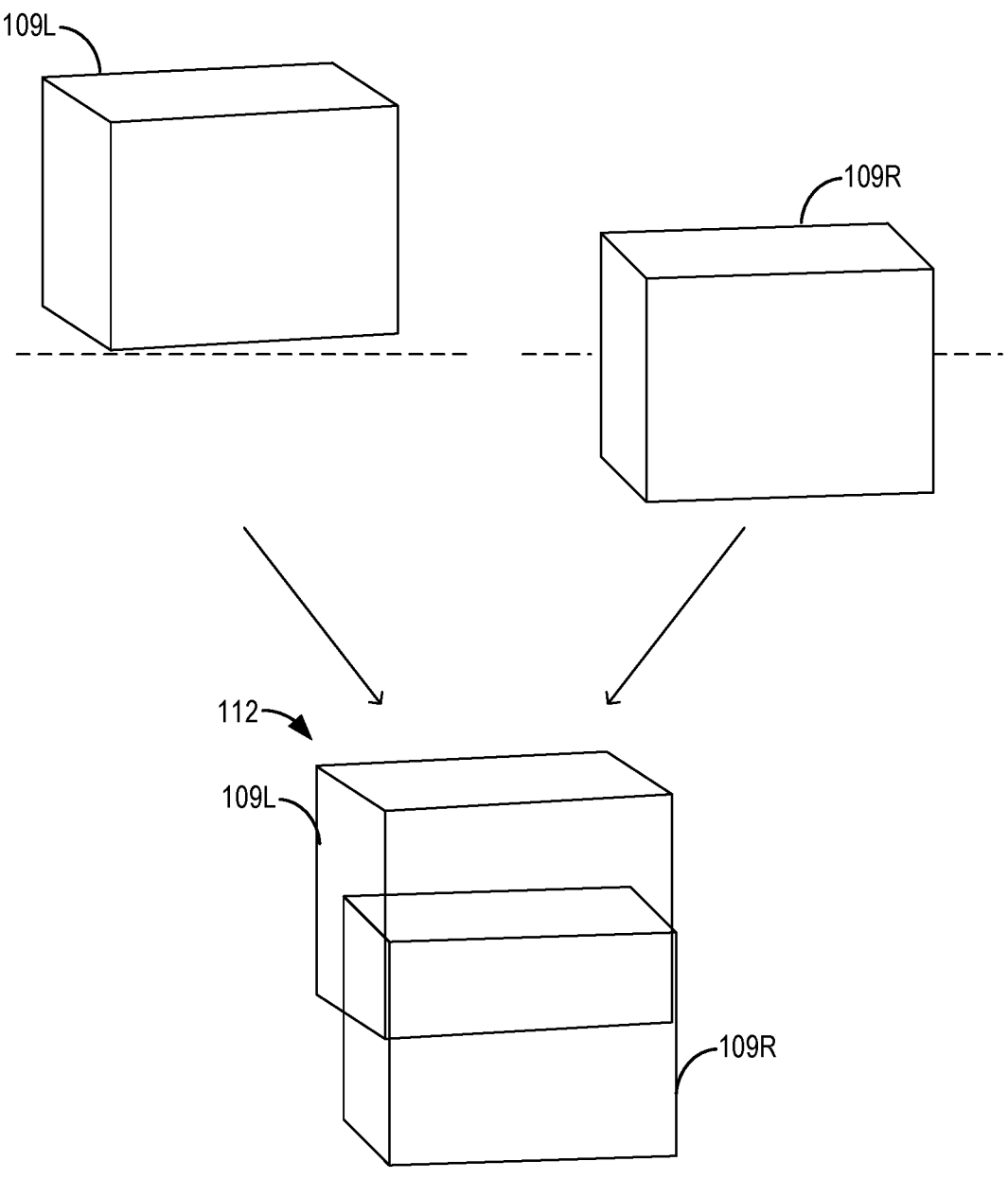
FIG. 3 schematically illustrates an example of vertical misalignment between the left eye image and the right eye image of FIG. 2 that causes the human vision system not to fuse the left eye and right eye images.

However, stereoscopic misalignments can occur in MR systems. FIG. 3 schematically shows an example of binocular vertical display misalignment. In the example of FIG. 3, the left eye image 109L is vertically offset with respect to the right eye image 109R with reference to the illustrated dashed line. This can occur due to software and/or hardware issues. Some examples of software issues that can cause vertical display misalignment include inaccurate placement of the virtual display content during rendering or inaccurate render camera positioning. Some examples of hardware issues that can cause vertical display misalignment include deformations due to differential thermal expansion or deformations due to mechanical impacts causing the displays to become misaligned.

Binocular vertical display misalignment can impact a user experience in various ways. For example, binocular vertical display misalignment can cause users to misperceive a virtual object's size and/or location in space. Further, in some instances, human vision systems may not fuse the left eye and right eye images, resulting in users experiencing blurred or double vision, as shown in the example of FIG. 3. Binocular vertical display misalignment can additionally or alternatively result in visual strain, visual discomfort, and/or vestibular discomfort for users. Vertical fusional amplitudes, or the amount of vertical retinal disparities between a left eye image and a right eye image of a virtual object that an observer can tolerate and fuse, are rather small. As a result, even seemingly small magnitudes of vertical display misalignment can cause the above-described issues.

To help detect and correct for such vertical display misalignment, the HMD 104 comprises a display misalignment detection system 118 to monitor the vertical display misalignment. As described in more detail below, one or more cameras 119 can be used to image the left eye display 108L and the right eye display 108R of FIG. 1 and track respective locations where the left eye image 109L and the right eye image 109R are displayed. The display locations of the left eye image 109L and the right eye image 109R can be corrected based on this tracking. As an example correction, a mapping of each image to respective display hardware pixel rows can be shifted upwardly or downwardly.

However, such corrections may be perceptible to the user based on a rate of the correction and a relative distance between the virtual content and a real-world background. For example, a correction can appear as a sudden apparent vertical displacement of a displayed virtual image. As a result, this correction can detract from the MR experience.

Accordingly, examples are disclosed that relate to reducing a noticeability of vertical display misalignment corrections. Briefly, a vertical fusional amplitude, which is the magnitude of binocular vertical offset beyond which fusion of left and right eye images breaks, is contingent on the co-planarity of the real-world background with respect to the vertically misaligned left eye and right eye images of a virtual object. The term co-planarity represents a magnitude of a difference between an apparent distance of the displayed virtual object from the user and a distance of the real-world background from the user. Tolerances for this vertical misalignment change with respect to the distance of real-world background from the virtual objects. More specifically, a vertical fusional amplitude is lower when real-world background (background with zero relative horizontal disparity) is co-planar with the virtual object, and increases with the amount of relative horizontal disparity of the real world background from the virtual object.

The disclosed examples use information about the proximities of a real-world background and of a displayed virtual object that the user is viewing to the viewer to determine a vertical misalignment correction strategy. When a virtual object is far away from the real-world background, or when the real-world background is far away from the user, tolerances for the vertical misalignment can be higher. As such, a vertical misalignment correction strategy in these instances can be delayed, or a relatively slower correction can be applied to avoid disrupting a user experience. On the other hand, if the real-world background is co-planar or close to co-planar with respect to the virtual object, a vertical misalignment strategy can be applied more quickly to avoid apparent double vision and/or other disruptions to a user experience.

Continuing with FIG. 1 the HMD 104 comprises a depth imaging system 114 configured to obtain depth image data 116 of the real-world environment 100. In some examples, the depth imaging system 114 comprises a stereo camera system. In other examples the depth sensing system can comprise time-of-flight (ToF) depth camera or a structured light depth camera.

The HMD 104 further comprises the above-mentioned misalignment detection system 118. The misalignment detection system 118 is configured to detect vertical misalignment between the left eye display 108L and the right eye display 108R. The misalignment detection system 118 comprises one or more cameras configured to track the left eye image 109L and the right eye image 109R as displayed by the left eye display 108L and the right eye display 108R.

The HMD 104 further comprises a controller 120. The controller 120 is configured to receive a signal from the misalignment detection system 118 comprising information related to vertical misalignment between the left eye display 108L and the right eye display 108R. The controller 120 further is configured to analyze image content 110 displayed via the binocular display system 106 to determine a distance to the foreground virtual object 112 in the image content 110 at which user 102 is gazing. The controller 120 is also configured to analyze depth image data 116 to determine a distance to a background object in the real-world environment 100. The vertical misalignment correction strategy is determined based at least upon the distance to the foreground virtual object and the distance to the background object. Basing a vertical misalignment correction strategy on the distance to the foreground object and the distance to the background object can enable the binocular display system to determine whether to perform vertical misalignment correction more gradually, more quickly, or not at all.

Figure 4:
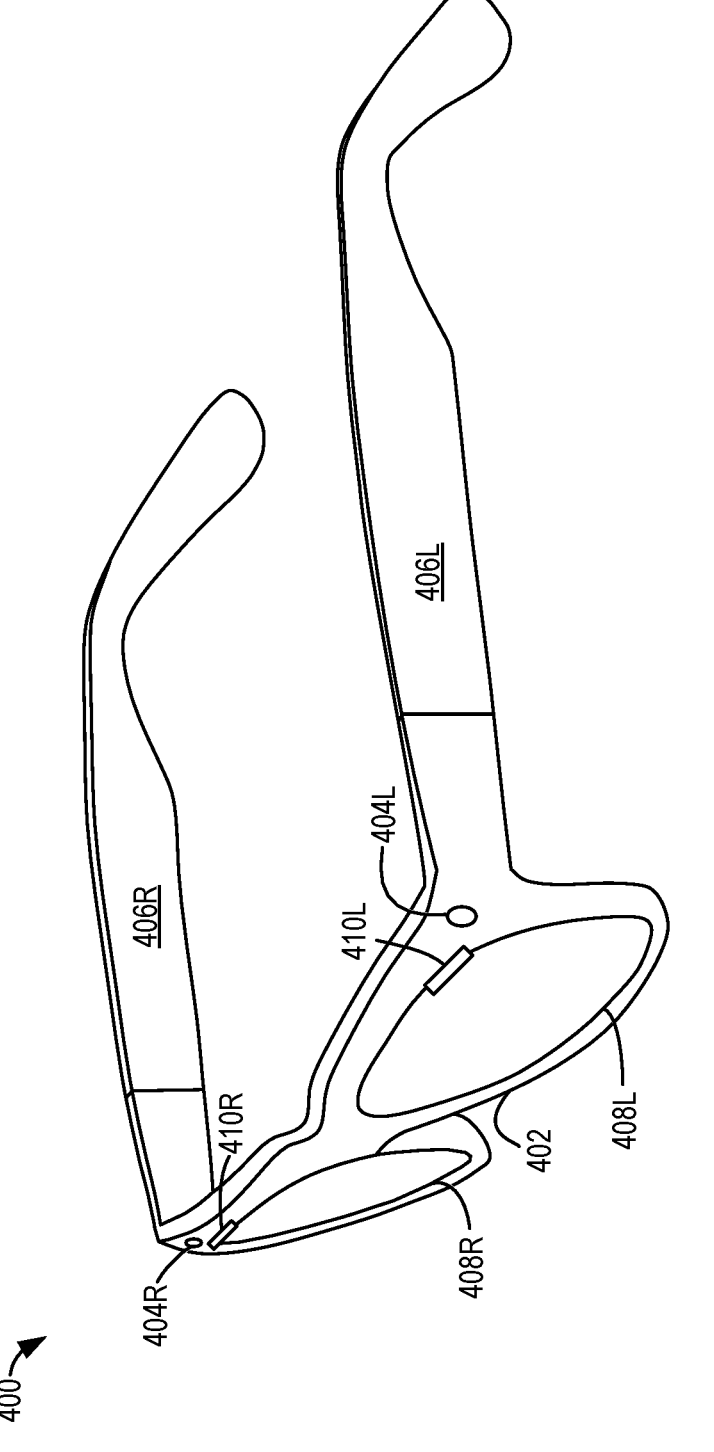
FIG. 4 illustrates an example HMD.

FIG. 4 illustrates an example HMD 400. HMD 400 is an example of HMD 104 of FIG. 1. The HMD 400 comprises a frame 402, a first camera 404L, a second camera 404R, a binocular display system, and temple pieces 406L, 406R.

The first camera 404L and the second camera 404R are located respectively at left and right sides of the frame 402. Each of the first camera and the second camera are adjacent to an outer edge of the frame. In some examples, the first camera 404L and the second camera 404R operate as a stereoscopic camera pair to obtain depth image data of a real-world environment.

The binocular display system of the HMD 400 comprises a left eye display 408L and a right eye display 408R supported by the frame 402. In some examples, each of the left eye display 408L and the right eye display 408R can take the form of an image-producing panel, such as a liquid crystal on silicon LCoS display or micro OLED display. In other examples, each of the left eye display 408L and the right eye display 408R can take the form of a scanning laser projector. The projected image can be delivered to the user eye by optics including a waveguide, one or more prisms, mirrors, and/or other suitable optics.

The HMD 400 further comprises one or more misalignment detectors 410L and 410R configured to detect at least a portion of light emitted by the left eye display 408L and the right eye display 408R, respectively. For example, the one or more misalignment detectors 410L and 410R can be arranged to detect a test portion of display imagery output by the left eye display 408L and the right eye display 408R. Such display imagery can comprise a test pattern. The test image as detected by the misalignment detector(s) 410L and 410R enables the HMD 400 to determine a magnitude of vertical misalignment between the left eye display 408L and the right eye display 408R (e.g., based upon distortions or deviations in the detected test pattern/image from an expected form of the test pattern/image).

Figure 5A:
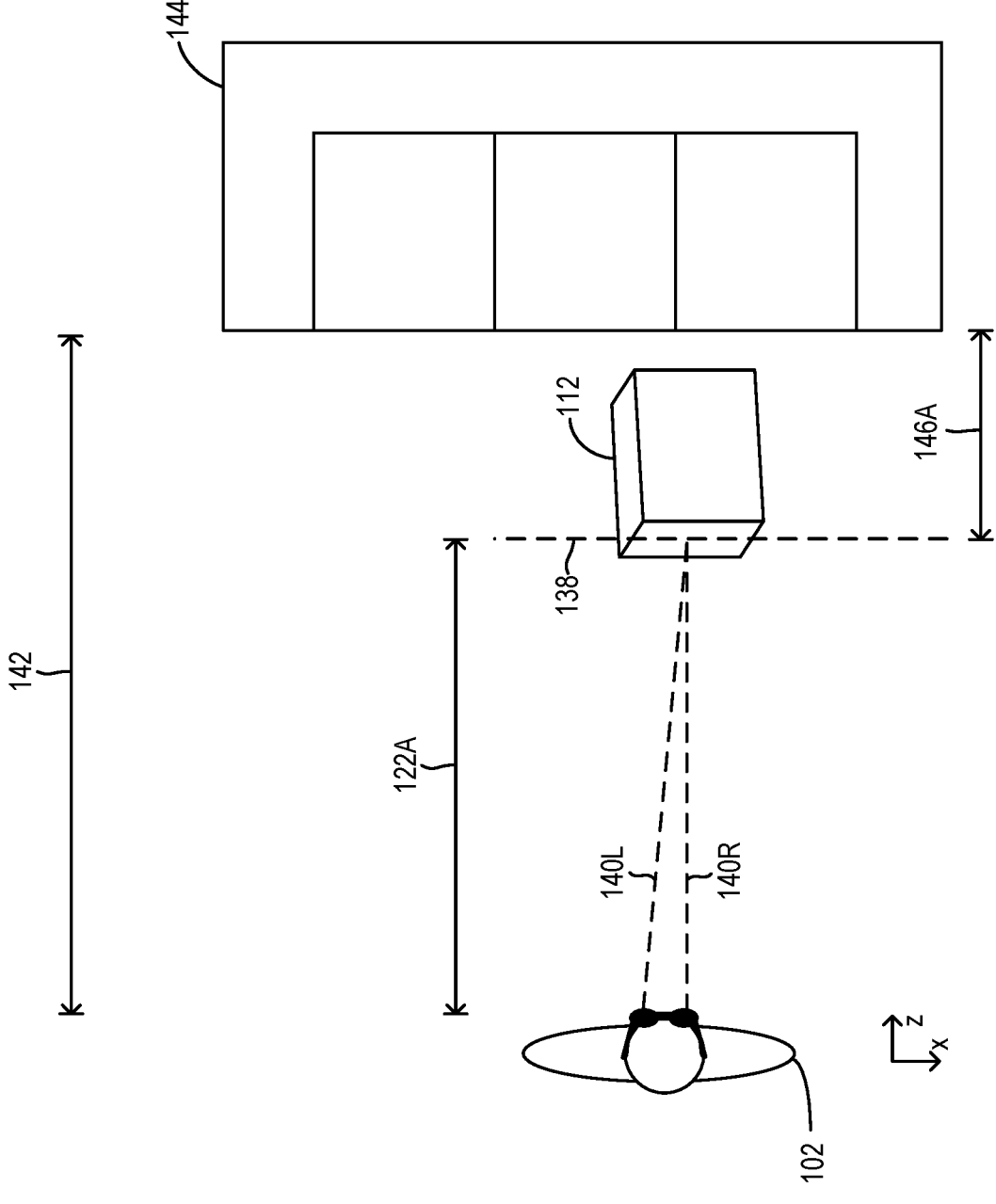
FIGS. 5A-5B show an example of the foreground virtual object of FIG. 1 located a first distance from the real-world background object, and a resulting non-fusion of vertically offset left eye and right eye images.

Referring again to FIG. 1, the controller 120 is configured to receive signals from the misalignment detection system 118 comprising information related to vertical misalignment between the left eye display 108L and the right eye display 108R. The controller 120 further is configured to analyze displayed image content to determine a distance to the foreground virtual object 112 at which the user 102 is gazing. FIG. 5A schematically shows a top-down view of the real-world environment 100 of FIG. 1. In FIG. 5A, foreground virtual object 112 is located a distance 122A from the HMD 104. In some examples, the distance 122A is obtained from a depth buffer of a rendering pipeline of the HMD 104. In other examples, the distance 122A is obtained in any other suitable manner. For example, the distance 122A may be obtained from source code of an application executed on the HMD 104, or the distance 122A may be output by the application.

In some examples, the distance 122A to the foreground virtual object 112 is determined by determining a distance to a vergence plane 138. In such examples, an eye-tracking system 124 of the HMD 104 can be used to determine the distance 136 to the vergence plane 138. Vergence refers to a point where the gaze lines 140L, 140R of the user's eyes intersect in space (e.g., on an object of focus). The vergence plane 138 is a plane located at a depth (e.g., a distance from the user) where gaze lines 140L, 140R determined by the eye tracking system intersect. As illustrated in FIG. 5A, the vergence plane 138 is parallel to the XY plane and orthogonal to the Z-axis (the depth axis). When the user 102 is gazing at the foreground virtual object 112, the distance to the vergence plane 138 can be used as a measure of the distance 122A of the foreground virtual object 112 from the user 102.

The controller 120 is further configured to analyze the depth image data 116 to determine a distance 142 to a background object 144 (e.g., a sofa) in the real-world environment 100. The distance 142 to the background object 144 is determined by the depth imaging system 114. As described in more detail below, the distance 142 to the background object 144 and the distance 122A to the foreground virtual object can be used to understand whether the vertical misalignment is likely to cause user discomfort or visual artifacts.

As introduced above, vertical misalignment can be more or less noticeable to a user based upon a degree of coplanarity of a displayed virtual object and a real-world background. More particularly, a vertical fusional amplitude of vertically misaligned left eye and right eye images differs depending upon this coplanarity. Thus, where the vertical misalignment is less noticeable to a user, a vertical misalignment correction can be delayed or applied more slowly. Likewise, where the vertical misalignment is more noticeable to a user, a vertical misalignment correction can be applied more quickly.

Figure 5B:
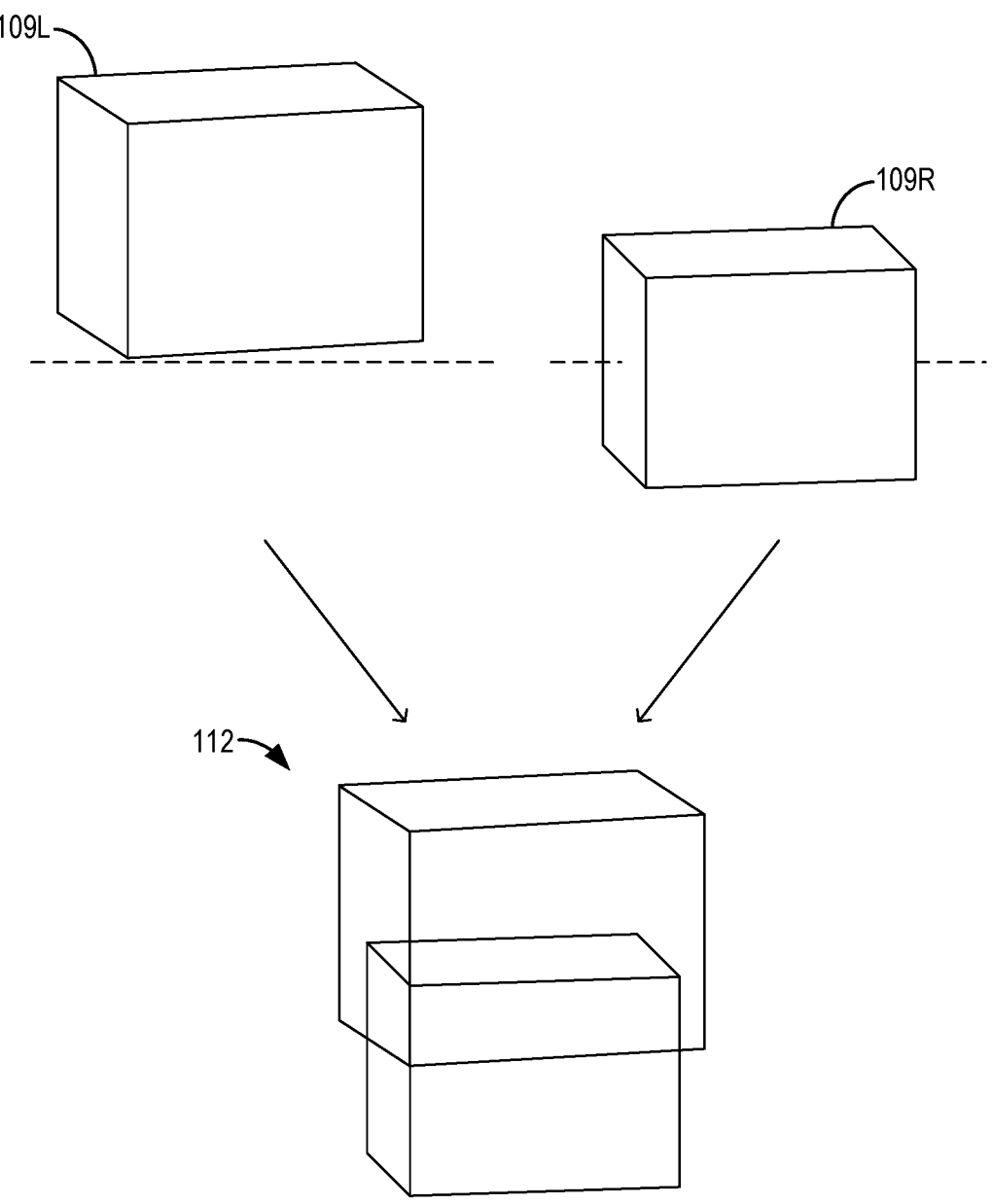

Different coplanarities and the resulting perceived virtual images, absent a correction, are illustrated in FIGS. 5A-5B and FIGS. 6A-6B. In FIG. 5A, the foreground virtual object 112 and the background object 144 are relatively more coplanar. FIG. 5B illustrates a vertical misalignment of left eye image 109L and right eye image 109R. In FIG. 5A the foreground virtual object 112 is relatively closer to the background object 144. Thus, in FIG. 5B, the left eye image 109L and the right eye image 109R of the foreground virtual object 112 are not fused in this example.

Figure 6A:
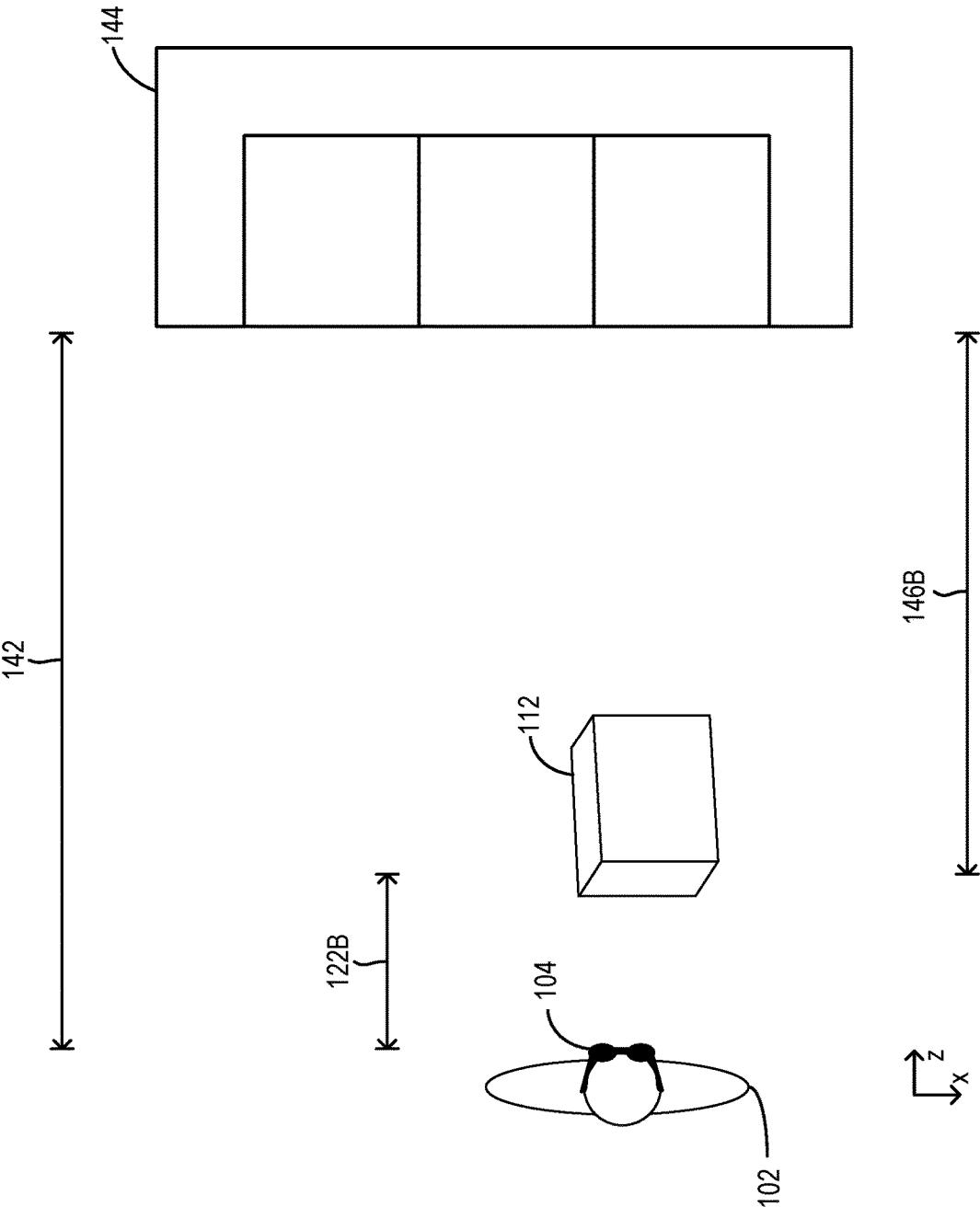
FIGS. 6A-6B show an example of the foreground virtual object of FIG. 1 located a second distance from the real-world background object, and a resulting fusion of vertically offset left eye and right eye images.

In contrast, in FIG. 6A, the foreground virtual object 112 is located a second distance 122B from the user 102, and the distance 146B between the background object 144 and the foreground virtual object 112 is farther than in FIG. 5A. As such, the foreground virtual object 112 and the background object 144 are relatively less coplanar compared to FIG. 5A. Thus, the vertical fusional amplitude may be larger in the example of FIGS. 6A-6B than in the example FIGS. 5A-5B. As a result, referring to FIG. 7B, the visual system of the user 102 fuses the left eye image 109L and the right eye image 109R.

Figure 6B:
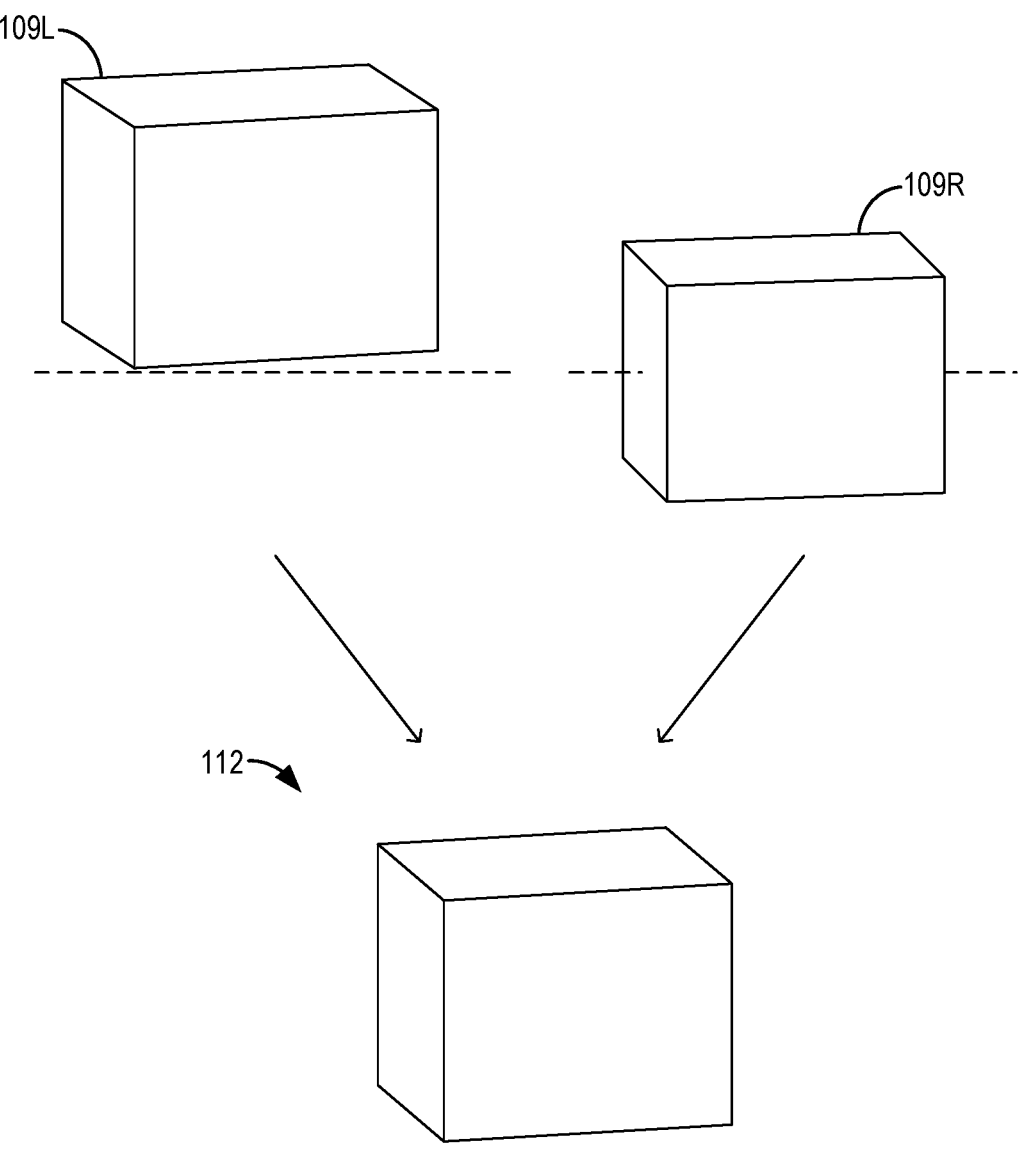
Figure 7:
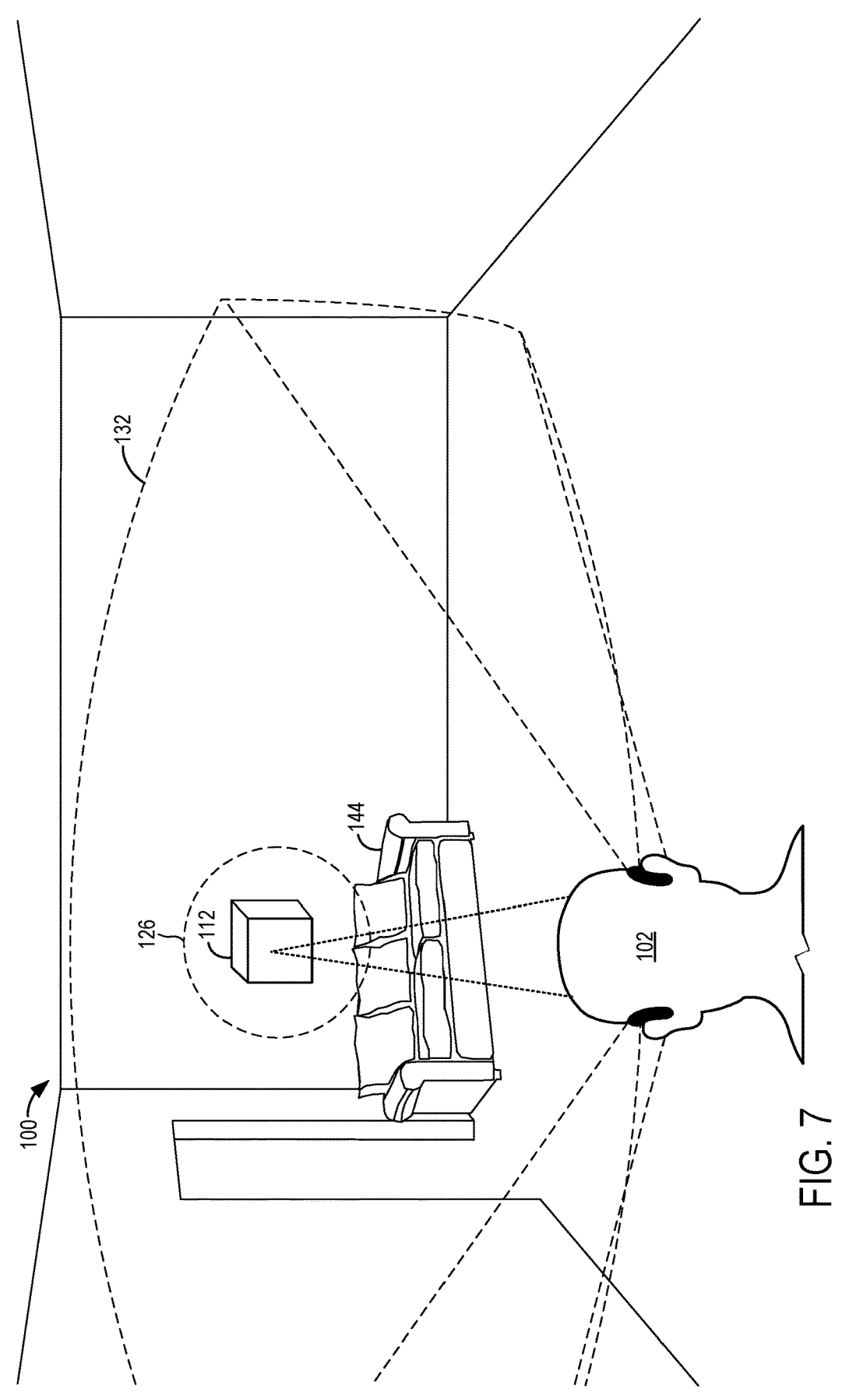
FIG. 7 schematically illustrates a foveal region within an example field of view for the HMD of FIG. 1.

Accordingly, and in one potential advantage of the present disclosure, the HMD 104 can determine different vertical misalignment correction strategies in the example of FIGS. 5A-5B and in the example of FIGS. 6A-6B. As one example, the HMD 104 may not apply a correction in the example of FIGS. 6A-6B, but apply a correction in the example of FIGS. 5A-5B. In another example, the HMD may apply a correction more slowly in the example of FIGS. 6A-6B than in the example of FIGS. 5A-5B.

Different vertical misalignment correction strategies can be applied, for example, based upon one or more threshold levels of coplanarity. As an example, the HMD 104 can apply a different correction the vertical misalignment in response to determining that a distance 146A between the foreground virtual object 112 and the background object 144 is in a range of 0-50% of the distance 142 between the user 102 and the background object 144. For example, if the distance 142 is ten meters, the HMD 104 may correct the vertical misalignment if the distance 146A between the foreground virtual object 112 and the background object 144 is five meters or less. In more specific examples, the HMD 104 may correct the vertical misalignment in response to determining that the distance 146A is in the range of 10-40% of the distance 142. In further more specific examples, the HMD 104 may correct the vertical misalignment in response to determining that the distance 146A is in the range of 20-30% of the distance 142. In this manner, the HMD 104 may correct the vertical misalignment when the user is less likely to tolerate the vertical misalignment.

Similarly, the HMD 104 may not correct the vertical misalignment in response to determining that the foreground virtual object 112 is relatively farther from the background object 144 relative to a position of the user 102. In some examples, referring again to FIG. 7A, the HMD 104 may not correct the vertical misalignment in response to determining that a distance 146B between the foreground virtual object 112 and the background object 144 is in a range of 50-100% of the distance 142 between the user 102 and the background object 144. In this manner, the HMD 104 may avoid correcting the vertical misalignment when the user is more likely to tolerate the vertical misalignment. This avoids potentially disrupting the MR experience due to visibility of the vertical misalignment correction. In other examples, the HMD 104 may correct the vertical misalignment when the distance 146B between the foreground virtual object 112 and the background object 144 is in a range of 50-100% of the distance 142 between the user 102 and the background object 144, but may apply a slower correction than when the coplanarity of the foreground virtual object and the background object is higher.

As mentioned above, in some examples, the HMD 104 can be configured to correct the vertical misalignment at a relatively slower rate in response to the foreground virtual object 112 being relatively closer to the background object 144. The HMD 104 can further be configured to correct the vertical misalignment at a relatively faster rate in response to the foreground virtual object 112 being relatively farther from the background object 144. In this manner, the HMD 104 is configured to correct the vertical misalignment faster when the user is less likely to notice the correction, than when the correction is more likely to disrupt the MR experience.

As a more specific example, the HMD 104 can be configured to correct the vertical misalignment within 1 second or less in response to the foreground virtual object 112 being greater than or equal to a threshold distance of the background object 144. The threshold distance may be a function of the distance between the foreground virtual object 112 and the background object 144 as described above. As a more specific example, the HMD 104 can be configured to correct the vertical misalignment instantaneously (in a single adjustment step, as opposed to progressively) in response to the foreground virtual object 112 being greater than or equal to a threshold distance of the background object. In other examples, the HMD 104 can be configured to correct the vertical misalignment at a rate of 10 arcminutes per second or greater. In this manner, the HMD 104 is configured to rapidly correct the vertical misalignment when the foreground virtual object 112 is relatively far from the background object 144. This is because, when the foreground virtual object 112 is relatively farther from the background object, the vertical misalignment correction may not be as perceptible to the user as when the foreground virtual object 112 is relatively closer to the background object 144.

In other examples, the HMD 104 is configured to correct the vertical misalignment within one second or greater in response to the foreground virtual object 112 being less than or equal to a threshold distance from the background object 144. In other examples, the HMD 104 is configured to correct the vertical misalignment at a rate in a range of 1-10 arcminutes per second. In this manner, the HMD 104 is configured to correct the vertical misalignment in a manner that is more subtle to the user when the vertical misalignment (and therefore the vertical misalignment correction) may be more perceptible.

In the examples described above, the vertical misalignment correction strategy is based at least in part on the distance between the foreground virtual object 112 and the background object 144 relative to a position of a user. In other examples, the vertical misalignment correction strategy is determined based on a reciprocal focal length of the user (e.g., in diopters). For example, the HMD 104 can correct the vertical misalignment in response to determining that the foreground virtual object 112 is in a range of 0.2-0.3 diopters behind the user's focal point. In other examples, a different range of diopters can be used. In some examples, the HMD is configured to determine the distance 142 to the background object 144 in a foveal area 145 of the user 102. The foveal area 145 is an area of a field of view that is focused on a user's fovea, and corresponds to a location at which a user's visual acuity is highest. In this manner, the distance 142 is based on a portion of the background object 144 at which the user 102 is most likely to directly compare to the foreground virtual object 112.

In some such examples, the image content 110 and the depth image data 116 are analyzed after the image content 110 is displayed. For example, the analysis of the image content 110 and the depth image data 116 may be initiated a selected time interval (e.g. 50-100 milliseconds) after the image content 110 is displayed. In this manner, the user 102 may have sufficient time to recognize and gaze at the foreground virtual object 112. This enables the HMD 104 to determine the foveal area 145 and/or the field of view 132 of the user 102, which can be used to analyze the image content 110 and the depth image data 116 as described above.

Figures 8, 9:
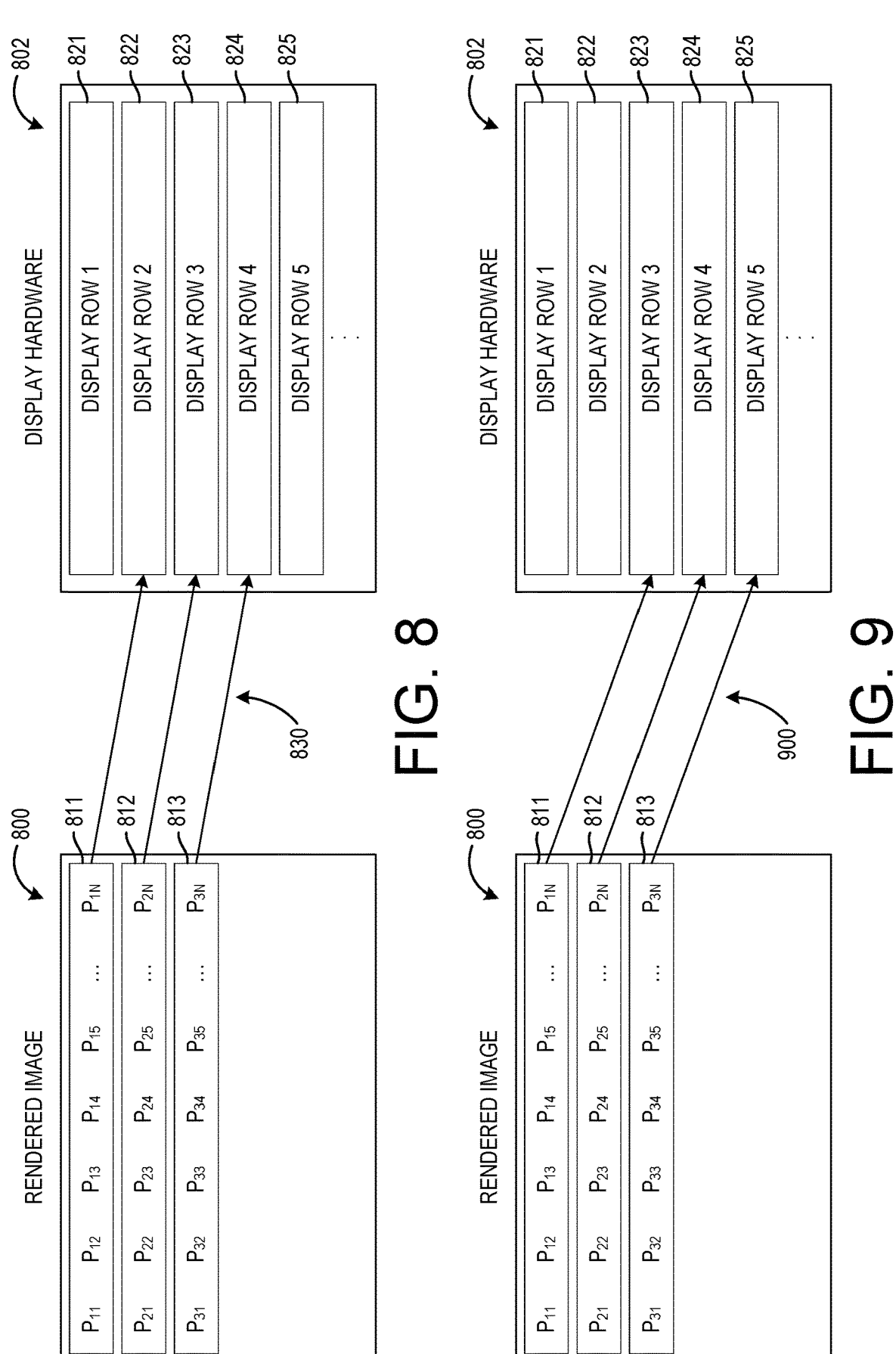
FIG. 8 illustrates an example mapping of rendered pixel data to display hardware prior to performing a vertical offset correction.
FIG. 9 illustrates an example remapping of the rendered pixel data of FIG. 8 to the display hardware of FIG. 8 following a vertical offset correction.

Based upon the determined vertical misalignment correction strategy, the HMD 104 is configured to control the binocular display system 106 to correct the vertical misalignment. As mentioned above, in some examples, the HMD 104 is configured to correct the vertical misalignment by mapping the image content to different pixel rows of display hardware. FIG. 8 illustrates an example mapping of rendered image 800 (e.g. in a frame buffer for display) to display hardware 802 of a binocular display system. Rendered image 800 can represent left eye image content or right eye image content, and display hardware 802 can represent a respective left display or right display of the binocular display system. Rendered image 800 comprises a plurality of pixel rows including pixel row 811, 812, 813. Each pixel row comprises pixel data (e.g., RGB pixel intensity) for a row of pixels in rendered image 800 (e.g., pixels $P_{11}$, $P_{12}$, $P_{13}$, $P_{14}$, $P_{15}$, . . . . $P_{1N}$ of pixel row 811).

Further, display hardware 802 comprises a plurality of display rows 821, 822, 823, 824, 825. Rendered image 800 is mapped to display hardware 802 using mapping 830. As shown in FIG. 11, pixel row 811 is mapped to a display row 822, pixel row 812 is mapped to a display row 823, and pixel row 813 is mapped to a display row 824. Display hardware can includes spare rows at the top and bottom of the array of display rows. Rendered image pixel data is not mapped to spare these rows initially. In the depicted example, display row 821 is a spare row.

As discussed above, performing a display misalignment correction may comprise updating the mapping of a frame buffer to the display hardware. FIG. 9 illustrates such an example where mapping 830 is updated to an updated mapping 900 to correct for vertical misalignment of left eye and right eye displays. In updated mapping 900, pixel row 811 is mapped to display row 823. Additionally, pixel row 812 is mapped to display row 824 and pixel row 813 is mapped to display row 825. As such, updated mapping 900 shifts the displayed image vertically downward by one display row in comparison to mapping 830. The mapping for a left eye image to a left display can be updated independently of a mapping for a right eye image to a right display. In some examples, performing a display misalignment correction comprises vertically shifting the displayed left eye image in an opposite direction to a vertical shift of the displayed right eye image. In other examples, the displayed left eye image and displayed right eye image can be shifted a different number of display rows in a same vertical direction.

Figure 10:
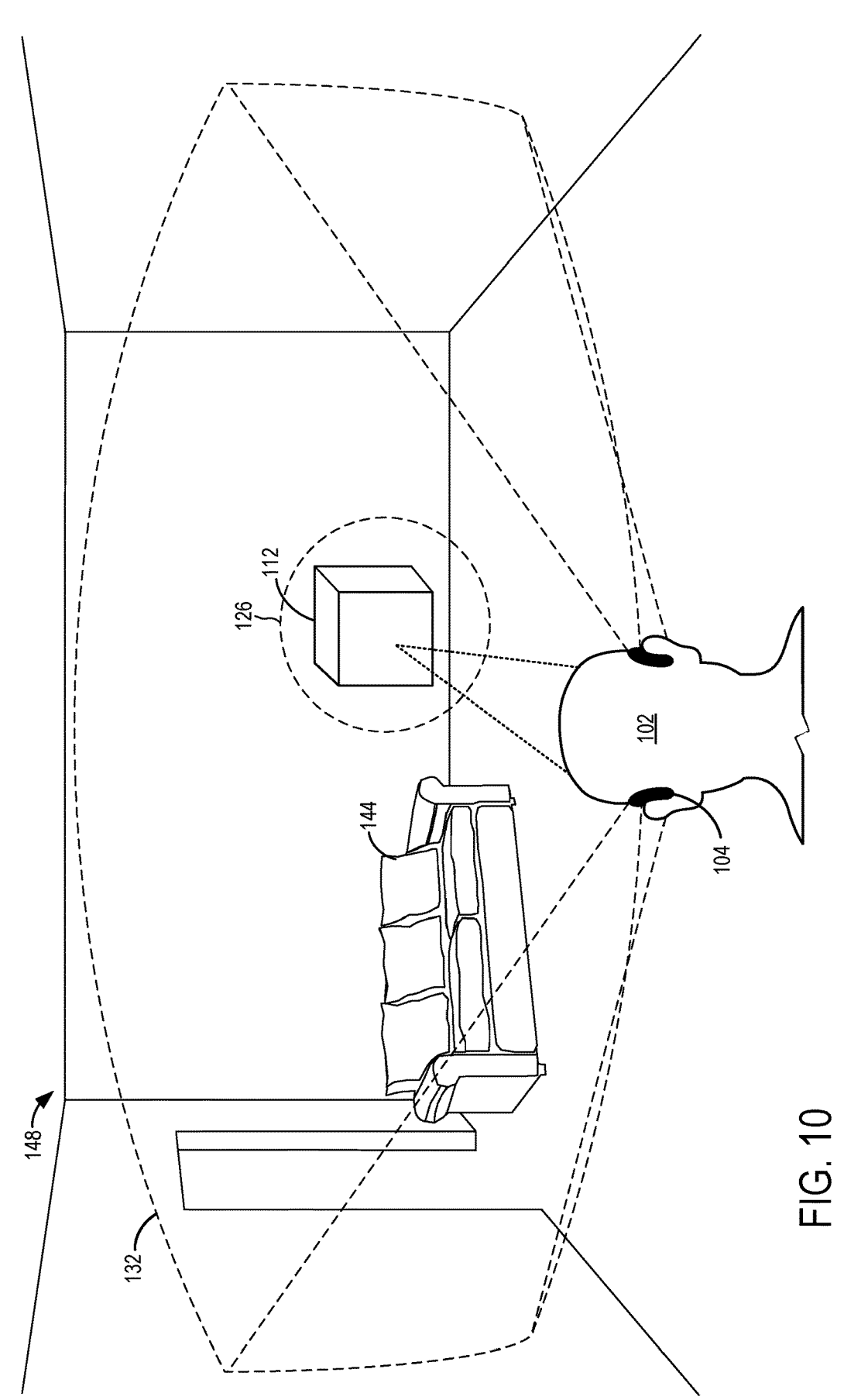
FIG. 10 shows another example of a real-world environment including a real-world background object that is in a peripheral view of a user gazing at a virtual object.

In some examples, the HMD 104 is configured to ignore the vertical misalignment, or to correct the vertical misalignment at the relatively slower rate in response to the background object 144 being located in the user's peripheral vision. FIG. 10 shows another example of a real-world environment 148 in which the background object 144 is located in the user's peripheral vision, at an edge of the field of view 132. The user 102 is less likely to fuse the background object 144 in the example illustrated in FIG. 10 than if the background object 144 is located closer to the center of the field of view 132. Accordingly, uncomfortable effects of the vertical misalignment are less likely to occur in the real-world environment 148 of FIG. 10 than in the real-world environment 100 of FIG. 1.

The HMD 104 can be configured to update the distance to the foreground virtual object 112, the distance to the background object 144, and/or the vertical misalignment correction strategy after passage of an update interval. In some examples, the update interval can be substantially equal to a frame rate of the binocular display system 106. For example, the update interval may be in a range of 0-240 Hz. In other examples, the distance to the foreground virtual object 112, the distance to the background object 144, and/or the vertical misalignment correction strategy are updated once per minute or less. In yet other examples, the distance to the foreground virtual object 112, the distance to the background object 144, and/or the vertical misalignment correction strategy are determined once per session (e.g., when the user 102 powers on the HMD 104 or opens an application on the HMD 104).

FIG. 11 illustrates a flow diagram depicting an example method 1100 for correcting vertical misalignment in a binocular display system. The following description of method 1100 is provided with reference to the software and hardware components described above and shown in FIGS. 1-10 and 12. It will be appreciated that the method 1100 can also be performed in other contexts.

At 1102, the method 1100 comprises receiving a signal from a misalignment detection system comprising information related to vertical misalignment between a left eye display and a right eye display of the binocular display system. For example, the controller 120 of the HMD 104 is configured to receive a signal from the misalignment detection system 118 of FIG. 1 comprising information related to vertical misalignment between the left eye display 108L and the right eye display 108R. In this manner, the HMD 104 can identify and measure the vertical misalignment.

The method 1100 further comprises, at 1104, analyzing image content displayed via the binocular display system to determine a distance to a foreground virtual object in the image content at which a user is gazing. For example, the controller 120 is configured to analyze the image content 110 to determine the distance 122A to the foreground virtual object 112 of FIG. 5A.

At 1106, the method 1100 comprises analyzing depth image data to determine a distance to a background object in a real-world environment. For example, the controller 120 is configured to analyze the depth image data 116 to determine the distance 142 to the background object 144 of FIG. 5A.

In some examples, at 1108, analyzing the depth image data comprises determining the distance to the background object in a foveal area of the user. For example, the HMD 104 may determine the distance 142 to the background object 144 within the foveal area 145 of FIG. 6. In this manner, the distance 142 is reflective of a portion of the background object 144 that might be in the foveal area of the user along with the foreground virtual object 112.

At 1110, the method 1100 comprises determining a vertical misalignment correction strategy based at least upon the distance to the foreground virtual object and the distance to the background object. In the example illustrated in FIG. 5A, the HMD 104 is configured to determine the vertical misalignment correction strategy based at least upon the distance 122A to the foreground virtual object 112 and the distance 142 to the background object 144. In this manner, the HMD 104 may determine a vertical misalignment correction strategy that does not detract from the MR experience.

The method 1100 further comprises, at 1112, based upon the vertical misalignment correction strategy, controlling the binocular display system to correct the vertical misalignment. For example, the HMD 104 of FIG. 1 is configured to control the binocular display system 106 to correct the vertical misalignment. In this manner, the HMD can prevent and/or alleviate issues related to the vertical misalignment.

In some examples, at 1114, the method 1100 comprises correcting the vertical misalignment at a relatively faster rate in response to the foreground virtual object being relatively farther from the background object, or correcting the vertical misalignment at a relatively slower rate in response to the foreground virtual object being relatively closer to the background object. For example, the HMD 104 is config- ured to correct the vertical misalignment faster when the user is less likely to notice the correction or when the visual effects of the vertical misalignment are likely to be more bothersome. Likewise, the HMD 104 is configured to correct the vertical misalignment more slowly when the correction is more likely to disrupt the MR experience, or when the visual effects of the vertical offset are likely to be less bothersome.

Further, in some examples, the method 1100 comprises, at 1116, correcting the vertical misalignment at the relatively slower rate in response to the background object being located in the user's peripheral vision. For example, the HMD 104 is configured to correct the vertical misalignment at a relatively slow rate in response to the background object 144 of FIG. 10 being at the edge of the field of view 132. In this manner, the vertical misalignment correction may be less likely to disrupt the MR experience.

Thus, the systems and methods disclosed herein enable a binocular display system to correct vertical misalignment with less disruption to a MR experience. As described above, a vertical misalignment correction strategy is deter- mined based at least upon a distance to a foreground virtual object and a distance to a background object. In this manner, the vertical misalignment correction strategy is determined that prevents issues associated with vertical misalignment and that does not detract from the MR experience. In some examples, the vertical misalignment is corrected at a rela- tively faster rate in response to the foreground virtual object being relatively farther from the background object. In this manner, the vertical misalignment may be corrected quickly when the user is less likely to notice the correction. In other examples, the vertical misalignment is corrected at a rela- tively slower rate in response to the foreground virtual object being relatively closer to the background object. In this manner, the vertical misalignment may be corrected more slowly when the correction is more likely to disrupt the MR experience.

In some examples, the methods and processes described herein may be tied to a computing system of one or more computing devices. In particular, such methods and pro- cesses may be implemented as a computer-application pro- gram or service, an application-programming interface (API), a library, and/or other computer-program product.

Figure 12:
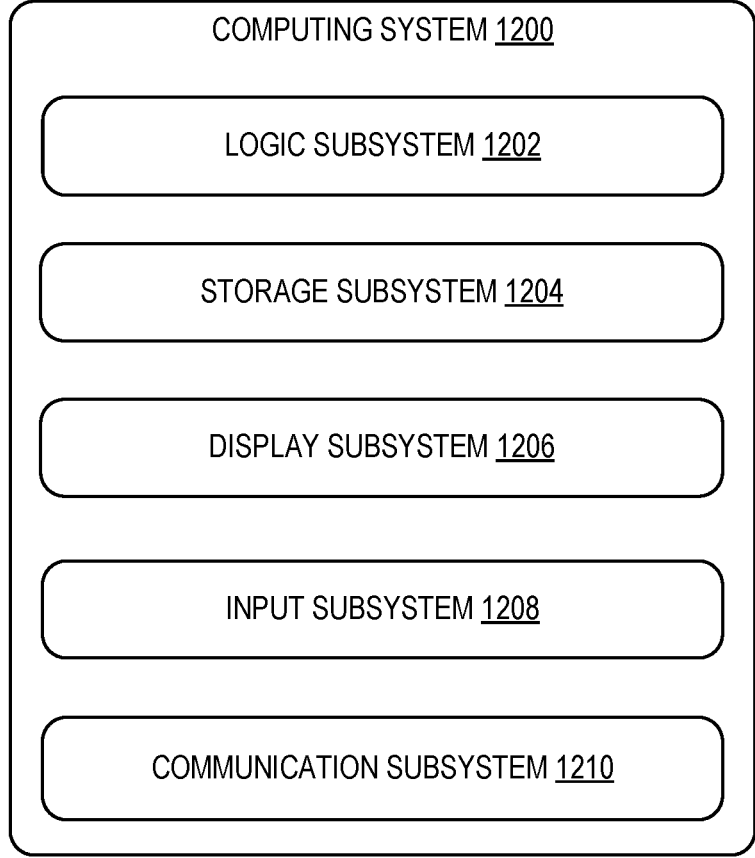
FIG. 12 is a block diagram of an example computing system.

FIG. 12 schematically shows a simplified representation of a computing system 1200 configured to provide any to all of the compute functionality described herein. Computing system 1200 may take the form of one or more personal computers, server computers, and computers integrated with wearable devices (e.g., an HMD), as examples. The con- troller 120 is an example of computing system 1200.

Computing system 1200 includes a logic subsystem 1202 and a storage subsystem 1204. Computing system 1200 may optionally include a display subsystem 1206, input subsys- tem 1208, communication subsystem 1210, and/or other subsystems not shown in FIG. 12.

Logic subsystem 1202 includes one or more physical devices configured to execute instructions. For example, the logic subsystem 1202 may be configured to execute instruc- tions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 1202 may include one or more hardware processors configured to execute software instruc- tions. Additionally, or alternatively, the logic subsystem 1202 may include one or more hardware or firmware devices configured to execute hardware or firmware instructions.

Processors of the logic subsystem 1202 may be single-core or multi-core, and the instructions executed thereon may be configured for sequential, parallel, and/or distributed processing. Individual components of the logic subsystem 1202 optionally may be distributed among two or more separate devices, which may be remotely located and/or configured for coordinated processing. Aspects of the logic subsystem 1202 may be virtualized and executed by remotely accessible, networked computing devices configured in a cloud-computing configuration.

Storage subsystem 1204 includes one or more physical devices configured to temporarily and/or permanently hold computer information such as data and instructions executable by the logic subsystem 1202. When the storage subsystem 1204 includes two or more devices, the devices may be collocated and/or remotely located. Storage subsystem 1204 may include volatile, nonvolatile, dynamic, static, read/write, read-only, random-access, sequential-access, location-addressable, file-addressable, and/or content-addressable devices. Storage subsystem 1204 may include removable and/or built-in devices. When the logic subsystem 1202 executes instructions, the state of storage subsystem 1204 may be transformed—e.g., to hold different data.

Storage subsystem 1204 may include removable and/or built-in devices. Storage subsystem 1204 may include optical memory (e.g., CD, DVD, HD-DVD, Blu-Ray Disc, etc.), semiconductor memory (e.g., RAM, EPROM, EEPROM, etc.), and/or magnetic memory, among others. Storage subsystem 1204 may include volatile, nonvolatile, dynamic, static, read/write, read-only, random-access, sequential-access, location-addressable, file-addressable, and/or content-addressable devices.

Aspects of logic subsystem 1202 and storage subsystem 1204 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

It will be appreciated that the storage subsystem 1204 includes one or more physical devices. However, aspects of the instructions described herein alternatively may be propagated by a communication medium (e.g., an electromagnetic signal, an optical signal, etc.) that is not held by a physical device for a finite duration.

The logic subsystem 1202 and the storage subsystem 1204 may cooperate to instantiate one or more logic machines. As used herein, the term "machine" is used to collectively refer to the combination of hardware, firmware, software, instructions, and/or any other components cooperating to provide computer functionality. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

The terms "module" and "program" may be used to describe an aspect of computing system 1200 implemented to perform a particular function. In some cases, a module, program, or engine may be instantiated via logic subsystem 1202 executing instructions held by storage subsystem 1204. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1206 may be used to present a visual representation of data held by storage subsystem 1204. This visual representation may take the form of a graphical user interface (GUI). As the herein described methods and processes change the data held by the storage subsystem 1204, and thus transform the state of the storage subsystem 1204, the state of display subsystem 1206 may likewise be transformed to visually represent changes in the underlying data. Display subsystem 1206 may include one or more display devices utilizing virtually any type of technology. Such display devices may be combined with the logic subsystem 1202 and the storage subsystem 1204 in a shared enclosure, or such display devices may be peripheral display devices.

When included, input subsystem 1208 may comprise or interface with one or more input devices such as a keyboard, mouse, touch screen. In some examples, the input subsystem 1208 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; and an infrared, color, stereoscopic, and/or depth camera for machine vision and/or gesture recognition.

When included, communication subsystem 1210 may be configured to communicatively couple computing system 1200 with one or more other computing devices. Communication subsystem 1210 may include wired and/or wireless communication devices compatible with one or more different communication protocols. As non-limiting examples, the communication subsystem 1210 may be configured for communication via a wireless telephone network, or a wired or wireless local- or wide-area network. In some examples, the communication subsystem 1210 may allow computing system 1200 to send and/or receive messages to and/or from other devices via a network such as the Internet.

The following paragraphs discuss several aspects of the present disclosure. One aspect provides a head-mounted display device, comprising a binocular display system comprising a left eye display and a right eye display, the binocular display system configured to display image content; a depth imaging system configured to obtain depth image data of a real-world environment; a misalignment detection system; and a controller configured to receive a signal from the misalignment detection system comprising information related to vertical misalignment between the left eye display and the right eye display, analyze the image content to determine a distance to a foreground virtual object in the image content at which a user is gazing, analyze the depth image data to determine a distance to a background object in the real-world environment, determine a vertical misalignment correction strategy based at least upon the distance to the foreground virtual object and the distance to the background object, and based upon the vertical misalignment correction strategy, control the binocular display system to correct the vertical misalignment.

Further to this aspect, in some examples, the distance to the foreground virtual object additionally or alternatively comprises a distance to a vergence plane.

Further to this aspect, in some examples, the controller is additionally or alternatively configured to determine the distance to the background object in a foveal area of the user.

Further to this aspect, in some examples, the controller is additionally or alternatively configured to analyze the image content and analyze the depth image data after the image content is displayed.

Further to this aspect, in some examples, the controller is additionally or alternatively configured to correct the vertical misalignment at a relatively slower rate in response to the foreground virtual object being relatively closer to the background object, and correct the vertical misalignment at a relatively faster rate in response to the foreground virtual object being relatively farther from the background object.

Further to this aspect, in some examples, the relatively faster rate additionally or alternatively comprises a rate of 10 arcminutes per second or greater.

Further to this aspect, in some examples, the relatively faster rate is additionally or alternatively instantaneous.

Further to this aspect, in some examples, the relatively slower rate additionally or alternatively comprises 1-10 arcminutes per second.

Further to this aspect, in some examples, the controller is additionally or alternatively configured to correct the vertical misalignment at the relatively slower rate in response to the background object being located in the user's peripheral vision.

Further to this aspect, in some examples, the controller is additionally or alternatively configured not to perform correction of vertical misalignment in response to the foreground virtual object being close to the background object.

Further to this aspect, in some examples, the controller is additionally or alternatively configured to map the image content to different pixel rows for display to correct the vertical misalignment.

Further to this aspect, in some examples, the controller is additionally or alternatively configured to, after an update interval, updating the distance to the foreground virtual object and the distance to the background object.

Another aspect provides a method for correcting vertical misalignment in a binocular display system, the method comprising: receiving a signal from a misalignment detection system comprising information related to vertical misalignment between a left eye display and a right eye display of the binocular display system; analyzing image content displayed via the binocular display system to determine a distance to a foreground virtual object in the image content at which a user is gazing; analyzing depth image data to determine a distance to a background object in a real-world environment; determining a vertical misalignment correction strategy based at least upon the distance to the foreground virtual object and the distance to the background object; and based upon the vertical misalignment correction strategy, controlling the binocular display system to correct the vertical misalignment.

Further to this aspect, in some examples, analyzing the depth image data additionally or alternatively comprises determining the distance to the background object in a foveal area of the user.

Further to this aspect, in some examples, the method additionally or alternatively comprises correcting the vertical misalignment at a relatively faster rate in response to the foreground virtual object being relatively farther from the background object, and correcting the vertical misalignment at a relatively slower rate in response to the foreground virtual object being relatively closer to the background object.

Further to this aspect, in some examples, the method additionally or alternatively comprises correcting the vertical misalignment at the relatively slower rate in response to the background object being located in the user's peripheral vision.

Further to this aspect, in some examples, the method additionally or alternatively comprises correcting the vertical misalignment at the relatively slower rate in response to the background object being located in the user's peripheral vision.

Another aspect provides a computing device, comprising: a processor configured to receive a signal from a misalignment detection system comprising information related to vertical misalignment between a left eye display and a right eye display of a binocular display system; analyze image content displayed via the binocular display system to determine a distance to a foreground virtual object in the image content at which a user is gazing; determine a distance to a background object in a real-world environment; determine a vertical misalignment correction strategy based at least upon the distance to the foreground virtual object and the distance to the background object, and based upon the vertical misalignment correction strategy, control the binocular display system to correct the vertical misalignment.

Further to this aspect, in some examples, the processor is additionally or alternatively configured to determine the distance to the background object in a foveal area of the user.

Further to this aspect, in some examples, the processor is additionally or alternatively configured to correct the vertical misalignment at a relatively slower rate in response to the foreground virtual object being relatively close from the background object, and correct the vertical misalignment at a relatively faster rate in response to the foreground virtual object being relatively far to the background object.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

"And/or" as used herein is defined as the inclusive or $\vee$, as specified by the following truth table:

| A | B | A $\vee$ B |
|---|---|---|
| True | True | True |
| True | False | True |
| False | True | True |
| False | False | False |

The terminology "one or more of A or B" as used herein comprises A, B, or a combination of A and B. The terminology "one or more of A, B, or C" is equivalent to A, B, and/or C. As such, "one or more of A, B, or C" as used herein comprises A individually, B individually, C individually, a combination of A and B, a combination of A and C, a combination of B and C, or a combination of A, B and C.

It will be understood that the configurations and/or approaches described herein are exemplary in nature, and that these specific examples or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted display device, comprising:
a binocular display system comprising a left eye display and a right eye display, the binocular display system configured to display image content;
a depth imaging system configured to obtain depth image data of a real-world environment;
a misalignment detection system configured to monitor vertical display misalignment of the binocular display system; and
a controller configured to
receive a signal from the misalignment detection system comprising information related to vertical misalignment between the left eye display and the right eye display,
analyze the image content to determine a distance from the head-mounted display device to a foreground virtual object in the image content at which a user is gazing,
analyze the depth image data to determine a distance from the head-mounted display device to a background object in the real-world environment,
determine a degree of coplanarity of the foreground virtual object and the background object based at least upon the distance from the head-mounted display device to the foreground virtual object and the distance from the head-mounted display device to the background object,
determine a rate at which to correct the vertical misalignment based at least upon the degree of coplanarity, and
control the binocular display system to correct the vertical misalignment at the rate determined.

2. The head-mounted display device of claim 1, wherein the distance from the head-mounted display device to the foreground virtual object comprises a distance to a vergence plane.

3. The head-mounted display device of claim 1, wherein the controller is configured to determine the distance from the head-mounted display device to the background object in a foveal area of the user.

4. The head-mounted display device of claim 1, wherein the controller is configured to analyze the image content and analyze the depth image data after the image content is displayed.

5. The head-mounted display device of claim 1, wherein the controller is configured to correct the vertical misalignment at a relatively slower rate in response to the foreground virtual object being relatively closer to the background object, and
correct the vertical misalignment at a relatively faster rate in response to the foreground virtual object being relatively farther from the background object.

6. The head-mounted display device of claim 5, wherein the relatively faster rate comprises a rate of 10 arcminutes per second or greater.

7. The head-mounted display device of claim 5, wherein the relatively faster rate is instantaneous.

8. The head-mounted display device of claim 5, wherein the relatively slower rate comprises 1-10 arcminutes per second.

9. The head-mounted display device of claim 5, wherein the controller is configured to correct the vertical misalignment at the relatively slower rate in response to the background object being located in the user's peripheral vision.

10. The head-mounted display device of claim 1, wherein the controller is further configured to map the image content to different pixel rows for display to correct the vertical misalignment.

11. The head-mounted display device of claim 1, wherein the controller is further configured to, after an update interval, update the distance from the head-mounted display device to the foreground virtual object and the distance from the head-mounted display device to the background object.

12. A method for correcting vertical misalignment in a binocular display system, the method comprising:
receiving a signal from a misalignment detection system comprising information related to vertical misalignment between a left eye display and a right eye display of the binocular display system;
analyzing image content displayed via the binocular display system to determine a distance from the binocular display system to a foreground virtual object in the image content at which a user is gazing;
analyzing depth image data to determine a distance from the binocular display system to a background object in a real-world environment;
determining a degree of coplanarity of the foreground virtual object and the background object based at least upon the distance from the binocular display system to the foreground virtual object and the distance from the binocular display system to the background object;
determining a rate at which to correct the vertical misalignment based at least upon the degree of coplanarity; and
controlling the binocular display system to correct the vertical misalignment at the rate determined.

13. The method of claim 12, wherein analyzing the depth image data comprises determining the distance from the binocular display system to the background object in a foveal area of the user.

14. The method of claim 12, further comprising:
correcting the vertical misalignment at a relatively faster rate in response to the foreground virtual object being relatively farther from the background object, and
correcting the vertical misalignment at a relatively slower rate in response to the foreground virtual object being relatively closer to the background object.

15. The method of claim 14, further comprising correcting the vertical misalignment at the relatively slower rate in response to the background object being located in the user's peripheral vision.

16. The method of claim 14, wherein correcting the vertical misalignment at the relatively slower rate comprises correcting the vertical misalignment at a rate of 1-10 arc-minutes per second.

17. A computing device, comprising:

a processor configured to:

receive a signal from a misalignment detection system comprising information related to vertical misalignment between a left eye display and a right eye display of a binocular display system;

analyze image content displayed via the binocular display system to determine a distance from the computing device to a foreground virtual object in the image content at which a user is gazing;

determine a distance from the computing device to a background object in a real-world environment;

determine a degree of coplanarity of the foreground virtual object and the background object based at least upon the distance from the computing device to the foreground virtual object and the distance from the computing device to the background object, determine a rate at which to correct the vertical misalignment based at least upon the degree of coplanarity, and control the binocular display system to correct the vertical misalignment at the rate determined.

18. The computing device of claim 17, wherein the processor is further configured to determine the distance from the computing device to the background object in a foveal area of the user.

19. The computing device of claim 17, wherein the processor is further configured to:

correct the vertical misalignment at a relatively slower rate in response to the foreground virtual object being relatively closer to the background object, and correct the vertical misalignment at a relatively faster rate in response to the foreground virtual object being relatively farther from the background object.

\* \* \* \* \*